(12) United States Patent
Yee

(10) Patent No.: US 7,889,718 B2
(45) Date of Patent: Feb. 15, 2011

(54) DETERMINING PHYSICAL LOCATION OF NETWORK DEVICES

(75) Inventor: Dawson Yee, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 502 days.

(21) Appl. No.: 11/431,809

(22) Filed: May 10, 2006

(65) Prior Publication Data

US 2007/0263641 A1 Nov. 15, 2007

(51) Int. Cl.
  *H04L 12/66* (2006.01)
  *H04L 12/28* (2006.01)
  *H04J 3/16* (2006.01)
  *H04M 11/04* (2006.01)

(52) U.S. Cl. .................. 370/352; 370/389; 370/401; 370/469; 379/41; 379/45

(58) Field of Classification Search ............... 379/45
See application file for complete search history.

(56) References Cited

U.S. PATENT DOCUMENTS

| | | | |
|---|---|---|---|
| 5,960,061 A * | 9/1999 | Fahie et al. .................... 379/37 |
| 7,739,402 B2 * | 6/2010 | Roese et al. .................. 709/242 |
| 2003/0130987 A1 * | 7/2003 | Edlund et al. .................... 707/3 |
| 2003/0185237 A1 * | 10/2003 | Baker, Jr. ..................... 370/469 |
| 2003/0232598 A1 | 12/2003 | Aljadeff et al. |
| 2004/0057425 A1 | 3/2004 | Brouwer et al. |
| 2005/0063519 A1 | 3/2005 | James |
| 2005/0083911 A1 * | 4/2005 | Grabelsky et al. ........... 370/352 |
| 2005/0083966 A1 | 4/2005 | Zodnik |
| 2005/0090225 A1 | 4/2005 | Muehleisen et al. |
| 2005/0175166 A1 | 8/2005 | Welenson et al. |
| 2005/0192999 A1 * | 9/2005 | Cook et al. .................. 707/102 |
| 2005/0195078 A1 * | 9/2005 | Basinger et al. ............. 340/521 |
| 2005/0202817 A1 | 9/2005 | Sudit |
| 2005/0202831 A1 | 9/2005 | Sudit |
| 2005/0207402 A1 * | 9/2005 | Kobayashi et al. .......... 370/352 |
| 2005/0213565 A1 | 9/2005 | Barclay et al. |
| 2005/0213716 A1 | 9/2005 | Zhu et al. |
| 2005/0232164 A1 | 10/2005 | Anzarouth et al. |
| 2005/0249207 A1 | 11/2005 | Zodnik |
| 2006/0023848 A1 * | 2/2006 | Mohler et al. ................. 379/41 |
| 2006/0233317 A1 * | 10/2006 | Coster et al. .................. 379/45 |

(Continued)

FOREIGN PATENT DOCUMENTS

WO  2005112385 A1  11/2005

OTHER PUBLICATIONS

Mahmoud H. Qusay., "LBS zone.com", J2ME and Location-Based Services retrieved at <<http://www.lbszone.com/content/view/176/1/>>, Jul. 5, 2005, pp. 1-7.

(Continued)

*Primary Examiner*—Huy D Vu
*Assistant Examiner*—Brandon Renner

(57) ABSTRACT

Determining a physical location of a network device includes determining a network address associated with the network device and correlating the network address with a physical location. The network address associated with the network device is an address of the network device, an address of a router coupled to the network device or an address of an other device at a same physical location as the network device. The other device may be a gas meter or an electric meter. A table may be consulted for the location information.

2 Claims, 6 Drawing Sheets

U.S. PATENT DOCUMENTS

2007/0058645 A1* 3/2007 Nannra et al. ............... 370/401
2007/0147348 A1* 6/2007 Lu ............................. 370/352
2007/0189469 A1* 8/2007 Croak et al. ................. 379/45

OTHER PUBLICATIONS

Schulzrinne, et al., "Providing Emergency Services in Internet Telephony", IEEE Internet Computing, retrieved at <<http://www1.cs.columbia.edu/~knarig/911.pdf>>, vol. 6. No. 3, May-Jun. 2002, pp. 1-15.

Vidal, Ron., "Enhancing 911 How VoIP Technology Can Improve Public Safety", Telecommunications Magazine, retrieved at <<http://www.level3.com/userimages/dotcom/pdf/Enhancing_911_White_Paper.pdf>>, Sep. 2004, pp. 1-4.

"1-TO-ALL Inc., Emergency Services Conditions", retrieved at <<http://www.1-to-all.com/emergency_conditions.htm>>, last viewed on Jan. 25, 2006, pp. 1-4.

* cited by examiner

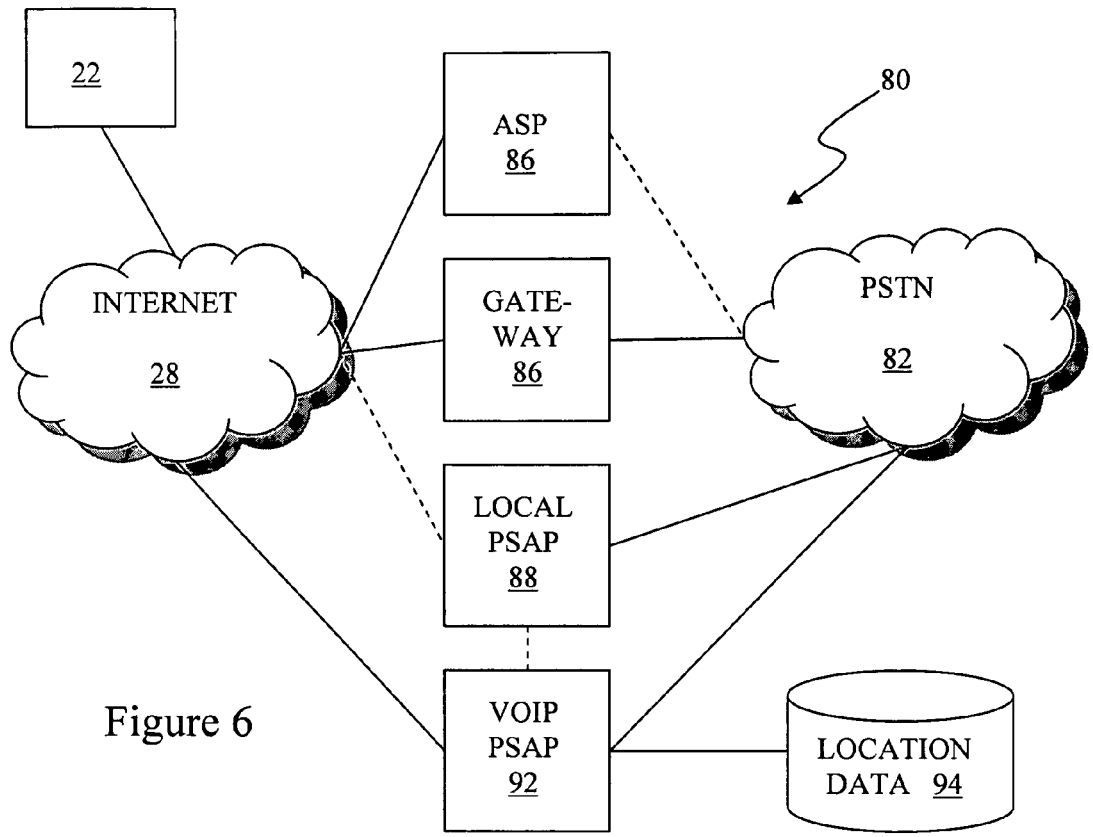

DETERMINING PHYSICAL LOCATION OF NETWORK DEVICES

BACKGROUND

Conventional wired telephones coupled to the public switching telephone network (PSTN) may be used to make emergency calls. In many, if not most, communities, a public service access point (PSAP) is configured to receive emergency calls through the PSTN. When a caller dials 911 on a wired telephone coupled to the PSTN, the call is routed to the PSAP which also receives additional information such as the physical location (i.e., street and number) of the wired telephone making the call as well as the phone number of the telephone making the call. Thus, if the caller is unable to speak or cannot identify his or her location, the additional information provided to the PSAP may be used to dispatch the police, fire department, ambulance, and/or whatever service is appropriate given the situation.

Voice over IP (VOIP) telephones may use the Internet for telephone communication. A VOIP telephone may convert a voice signal into digital data that is transmitted over the Internet to a gateway that couples the Internet with the PSTN. The data is converted to a conventional voice signal at the gateway and provided to a recipient over the PSTN. An analogous process occurs in reverse where voice signals from a user of a conventional telephone coupled to the PSTN are provided to the gateway which converts the voice signals to digital data and then transmits the digital data to a receiving a VOIP telephone were the data is converted to an audio signal for a user of the VOIP telephone.

One difficulty with VOIP telephones is that, unlike regular wired telephones that have a fixed telephone number and physical location, a VOIP telephone may be moved to any location capable of providing an appropriate data interface to allow the VOIP telephone to exchange data with the Internet. Thus, a user of a VOIP telephone may move the phone from location to location without informing the telephone company (or anyone else) of the new location of the VOIP telephone. If the user of the VOIP telephone dials 911 in connection with an emergency, it is difficult, if not impossible, for the attendants at the PSAP to know the physical location of the caller without speaking with the caller and thus, the attendants at the PSAP may not know where to dispatch emergency services.

In addition, since the signal is provided over the Internet, it may be difficult, if not impossible, to know the particular PSAP that is appropriate for handling the emergency call. It is important that an emergency call be directed to an appropriate PSAP close to the physical location of the caller rather than a PSAP that is geographically distant from the caller. Otherwise, it may be difficult for a PSAP located in one state to know how to direct emergency services to a caller having an emergency in a different state. Accordingly, it is not just important to know the physical location of the caller, but it is also important to know the appropriate PSAP to which emergency calls should be directed for the caller.

It is desirable to provide a system that facilitates locating network devices and, in the case of VOIP telephones (or the equivalent), determines a local PSAP for a caller using a VOIP telephone to access emergency services.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The system described herein determines a physical location of a network device by determining a network address associated with the network device and correlating the network address with a physical location. The network address associated with the network device is an address of the network device, an address of a router coupled to the network device or an address of an other device at a same physical location as the network device. The other device may be a gas meter or an electric meter. A table may be consulted for the location information.

The system described herein dispatches emergency services based on a communication from a network device by determining if there is a network address associated with the network device, if there is a network address associated with the network device, determining a physical location corresponding to the network address, if there is not a network address associated with the network device or if there is not a physical location corresponding to the network address, speaking to a caller using the network device to obtain a physical location, and transferring the call and information relating to the physical location to a public service access point.

The system described herein handles emergency calls placed using a network device by receiving a call initially handled by another entity that is coupled to the network device via the Internet, consulting user information to determine a location of the caller, and causing emergency services to be dispatched to the location.

DESCRIPTION OF THE DRAWINGS

FIG. 6 is a diagram showing the Internet, the PSTN, a gateway, an alternative service provider, a local PSAP, a VOIP PSAP, location data, and a network device according to the system described herein.

FIG. 7 illustrates a table used to correlate network addresses and subnet addresses to provide alternative service provider and location information according to the system described herein.

DETAILED DESCRIPTION

Described herein are various technologies and techniques for determining a physical location of network devices. Various embodiments are described more fully below with reference to the accompanying drawings, which form a part hereof, and which show specific exemplary embodiments for practicing various embodiments. However, other embodiments may be implemented in many different forms and should not be construed as limited to the embodiments set forth herein; rather, these embodiments are provided so that this disclosure will be thorough and complete. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

The logical operations of the various embodiments are implemented (1) as a sequence of computer implemented steps running on a computing system and/or (2) as interconnected machine modules within the computing system. The implementation is a matter of choice dependent on the performance requirements of the computing system implementing the embodiment. Accordingly, the logical operations making up the embodiments described herein are referred to alternatively as operations, steps or modules.

Figure 1:
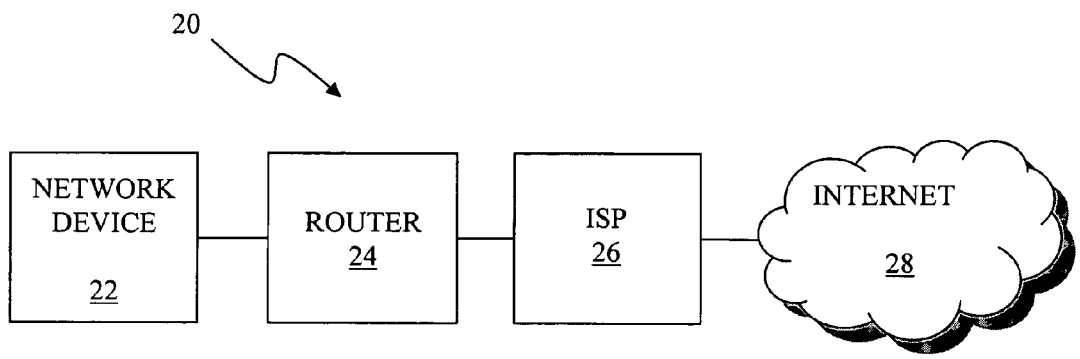
FIG. 1 is diagram illustrating a network device, a router, an ISP, and the Internet according to the system described herein.

Referring to FIG. 1, a diagram 20 illustrates a network device 22, such as a voice over IP (VOIP) telephone, a router 24, an Internet service provider (ISP) 26 and the Internet 28 (or other appropriate network). The network device 22 is coupled to the router 24. The router 24 is coupled to and provides access to the ISP 26, while the ISP 26 provides the router 24 and the network device 22 with access to the Internet 28. The network device 22 may be portable so that the network device 22 may be moved to any one of a number of physical locations and coupled to a network there that supports connection of network devices to the Internet 28. The network device 22 may be a VOIP telephone and/or any device that is equivalent for purposes of the discussion herein, such as any networked full-duplex communication device.

In some embodiments, the network device 22 may have a variable network address that it obtains using, for example, the DHCP protocol. Thus, the router 24 may act as a DHCP server that provides network addresses to devices coupled thereto such as the network device 22. In some embodiments, the network address provided by the router 24 to the network device 22 may be a private address that is not directly addressable through the Internet 28. Examples of such private addresses include the addresses 192.168.x.x and 10.x.x.x.

The term "router" as used herein should be understood as including any type of switch, hub, modem (such as a cable modem) or any other device capable of providing a network device access (directly or indirectly) to a network such as the Internet. In some cases, the router may provide DHCP (or similar) network addressing services to the network device 22 so that the network device 22 may have a variable address set by the router 24. In other instances, it is possible for other components of the system to provide DHCP (or similar) addressing services or even the network device 22 to provide its own address and/or to provide addressing services for other devices. It is also possible for the network device 22 to have a fixed network address. However, such a fixed address may limit the portability and movability of the network device 22.

In an embodiment herein, the router 24 may present an address to the ISP 26 that is different from the address of the network device 22 and different from the address presented by the router 24 to the network device 22. The address presented by the router 24 to the ISP 26 may be on an entirely different subnet than the address presented by the router 24 to the network device 22. In an embodiment herein, the address presented by the router 24 to the network device 22 is on the same subnet as the address used by the network device 22. Thus, for example, the router may present the address 192.168.1.1 to the network device 22 and the network device 22 may use the address 192.168.1.100.

In an embodiment herein, network data is transferred from a source device to a destination device through the Internet 28 via a number of intermediary devices. Thus, for example, data may be transferred from device A to device D by first being transferred from device A to device B, then from device B to device C, and finally from device C to device D. As data is transferred from one device to another, network address information may be appended to the data so that it is possible to trace the path of the data and to determine the network address of the source of the data. Thus, for example, if data is relayed from the network device 22 to the modem 24 and then to the ISP 26, it may be possible for the ISP 26 (or another entity) to determine the network address of both the router 24 and the network device 22 by examining the data.

Figure 2:
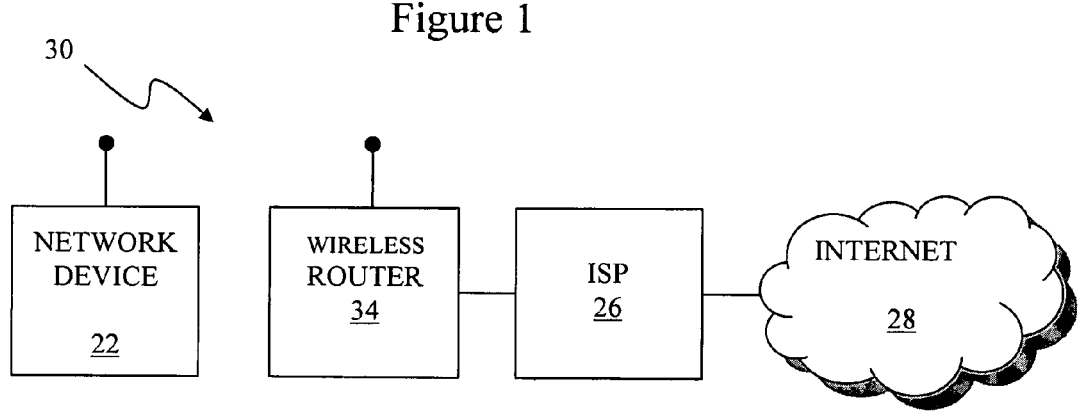
FIG. 2 is diagram illustrating a network device, a wireless router, an ISP, and the Internet according to the system described herein.

Referring to FIG. 2, a diagram 30 illustrates an alternative embodiment where the network device 22 transmits network data to a wireless router 32 that is coupled to the ISP 26. In instances where the network device 22 is a VOIP telephone, the transmission protocol used between the network device 22 and the wireless router 32 may not be a conventional telephone or cellular phone protocol. Instead, a wireless computer data transmission protocol may be used, such as the 802.11g protocol. Of course, any other appropriate protocol may be used.

Figure 3:
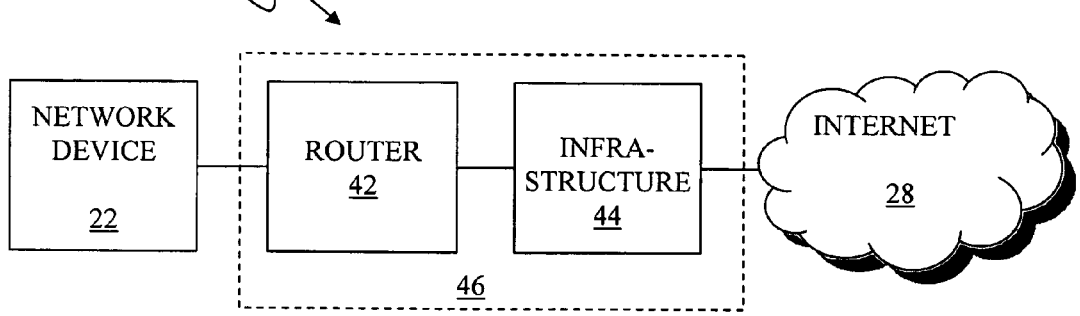
FIG. 3 is a diagram illustrating a network device coupled to a router and infrastructure for an organization that is used to access the Internet according to the system described herein.

Referring to FIG. 3, a diagram 40 illustrates the network device 22 coupled to a router 42 which is coupled to network infrastructure 44 that is coupled directly to the Internet 28. In the diagram 40 of FIG. 3, there is no Internet service provider. Instead, the router 42 and the infrastructure 44 are part of an organization 46 that is large enough and sophisticated enough to be coupled directly to the Internet 28. An example of such an organization is a large university or large high-tech company or even an Internet service provider. In the diagram 40, the organization 46 is capable of handling relatively sophisticated subnet routing and switching needed to be coupled directly to the Internet 28. The infrastructure 44 may be implemented using conventional components that are commercially available. The router 42 may be a conventional, commercially-available router/hub/switch/etc. like the router 24 and/or the wireless router 32, discussed above.

Figure 4:
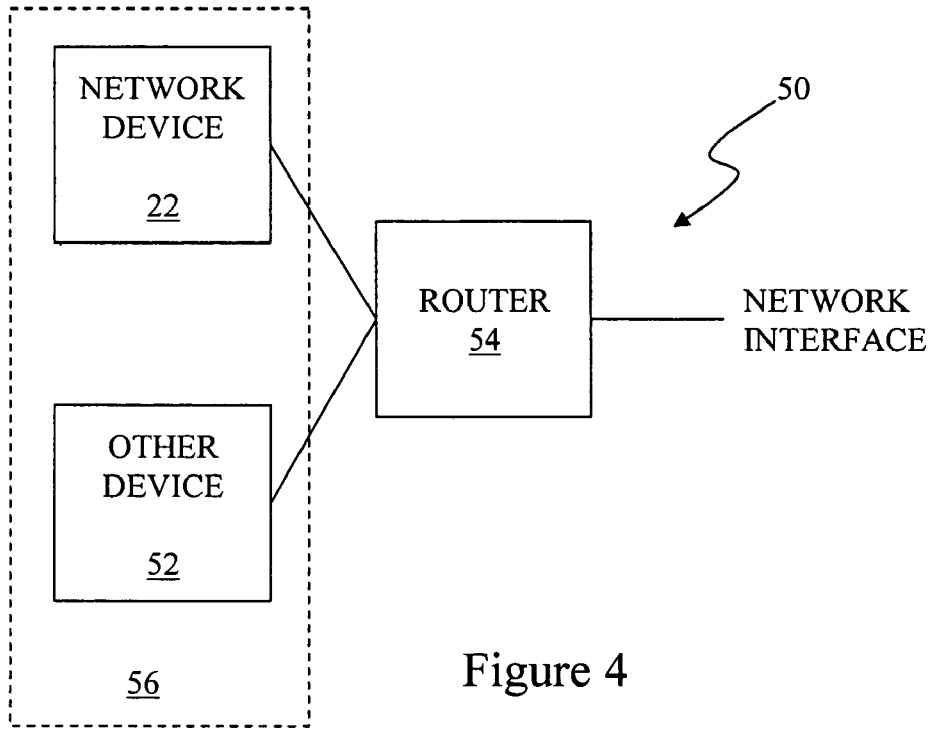
FIG. 4 is a diagram illustrating a network device and an other device in a same physical location according to the system described herein.

Referring to FIG. 4, the network device 22 and an other device 52 are coupled to a router 54 that is like the routers 24, 32, 42, discussed above. The network device 22 and the other device 52 may be provided at a same physical location 56 (e.g., at a single residence). The other device 52 may be a fixed, relatively immovable device, such as a gas meter or electric meter that is coupled to the Internet 28. In the diagram 50, both the network device 22 and the other device 52 communicate with the Internet 28 through the router 54. Accordingly, any location specific information associated with the other device 52 may also be associated with the network device 22 since both devices 22, 52 share the router 54 and thus both devices 22, 52 may be assumed to be in close physical proximity. As discussed elsewhere herein, information about the physical location 56 associate with the other device 52 may be used to determine that the network device 22 is also at the physical location 56.

Figure 5:
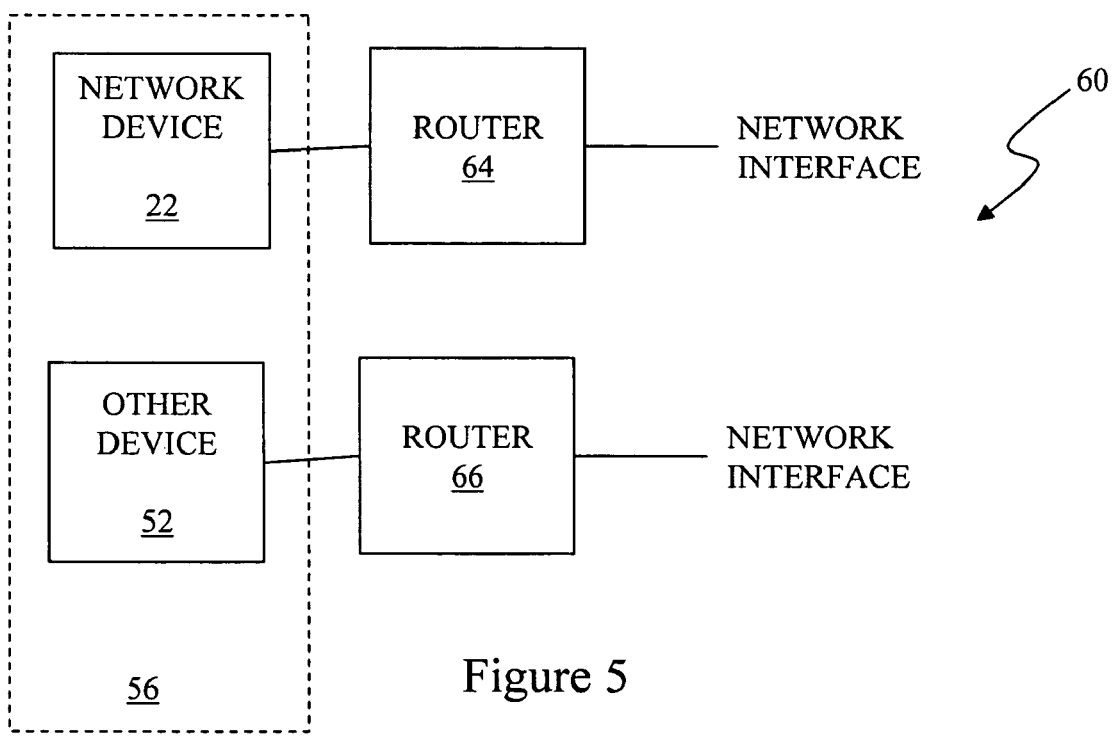
FIG. 5 is a diagram illustrating a network device and an other device in a same physical location where the network device communicates with the Internet through a first router and the other device communicates with the Internet using a second router according to the system described herein.

Referring to FIG. 5, a diagram 60 illustrates the network device 22 and the other device 52 sharing the same physical location 56. However, the diagram 60 also shows that the network device 22 communicates with the network (Internet 28) through a first router 64 while the other device 52 communicates with the network (Internet 28) using a second router 66. Unlike the diagram 50 of FIG. 4, the network device 22 and the other device 52 do not share a router. Thus, it may be necessary to ascertain additional information in order to determine that the network device 22 and the other device 52 share the physical location 56. The additional information may include, for example, information that the router 64 and the router 66 are physically proximate to each other and/or both service the same physical location 56.

Referring to FIG. 6, a diagram 80 illustrates the network device 22 coupled to the Internet 28. In the diagram 80, there are no intervening devices such as routers, ISPs, infrastructure, etc. show between the network device 22 and the Internet 28. However, it may be assumed that such intervening devices are used, as appropriate, but are not show in order to simplify the diagram 80 to facilitate the discussion herein.

The diagram 80 also shows a PSTN 82 used telephone communication between users. The PSTN 82 is coupled to the Internet 28 using a gateway 84 that converts data transmitted via the Internet 28 to voice signals that are transmitted via the PSTN 82 and vice versa. Of course, if the network device 22 is a type of device other than a device like a VOIP telephone (e.g., a pager or other type of message device), then a different type of conversion may be provided by the gateway 84.

The diagram 80 also shows an alternative service provider 86 (ASP) that may be associated with the other device 52 described above. For example, if the other device 52 is a gas meter coupled to the Internet 28, than the alternative service provider 86 may represent the gas company associated with the meter. Alternatively, the ASP 86 may represent the Internet service provider 26 described above or may represent any service provider that uses the Internet and has or is capable of obtaining information that correlates Internet devices with physical locations of those devices, as described in more detail elsewhere herein. In an embodiment herein, the ASP 86 may be coupled to the Internet 28 and, optionally, may also be coupled to the PSTN 82. Accordingly, in the example given above where the ASP 86 represents a gas company, coupling the ASP 86 to the PSTN 82 represents communicating with the gas company via the voice telephone network.

The diagram 80 also shows a local PSAP 88, which represents a conventional PSAP that is local to the network device 22 (and thus the user of the network device 22). In instances where the network device 22 is used to contact emergency services, the emergency services appropriate for the user at the network device 22 may be dispatched by the local PSAP 88. The local PSAP 88 is coupled to the PSTN 82 and, optionally, may also be coupled to the Internet 28.

The diagram 80 also shows an optional VOIP PSAP 92 that may provide additional PSAP-like services for the network device 22. In an embodiment herein, the VOIP PSAP 92 is separate from the local PSAP 88. However, in other embodiments, it is possible for the functionality provided by the VOIP PSAP 92 described herein to be provided by the local PSAP 88 so that, in effect, the local PSAP 88 and the VOIP PSAP 92 are implemented as a single entity. An advantage of implementing the VOIP PSAP 92 as a separate entity is that doing so does not require modification of existing local PSAP installations. Of course, implementing the local PSAP 88 and a VOIP PSAP 92 as a single entity may be more cost-effective in certain situations. In instances where the local PSAP 88 and the VOIP PSAP 92 are implemented as separate entities, there may be a direct communication link between the local PSAP 88 and a VOIP PSAP 92. In addition, the VOIP PSAP 92 may be coupled to both the PSTN 82 and the Internet 28.

The data element 94 contains data that is used by the VOIP PSAP 92 to correlate Internet addresses/subnet addresses, ASP's, and user locations as discussed in more detail elsewhere herein. Information that is stored in the data element 94 may be from a variety of sources including hardcoded information initially provided as part of the system, information from one or more local PSAP's, information obtained in connection with previous emergency calls, information provided by users, ISPs, ASP's, etc.

Referring to FIG. 7, a table 100 contains a plurality of elements 102-104 that may be used to correlate network addresses provided in connection with data transmitted from the network device 22 to the VOIP PSAP 92. The table 100 may be indexed according to a network address or subnet address to determine a corresponding one of the elements 102-104. Each of the elements 102-104 contains a field for the network address or subnet address. Each of the elements 102-104 also contains fields for identifying the alternative service provider (if any) and a corresponding physical location, if known. One or more of the fields of any one of the elements 102-104 may be blank if there is no corresponding information (e.g., no corresponding ASP) or if the corresponding information is not known. Of course, there may be addresses or subnet addresses for which there are no entries in the table 100 at all.

Note that, as discussed elsewhere herein, the network or subnet address that may be provided to index the table 100 may be from the network device 22, from a router or similar device coupled to the network device 22, and/or may be provided by the other device 52, if one exists. Thus, for the discussion herein, any reference to an address or a subnet address may be considered a reference to an address of any related device.

Figure 8:
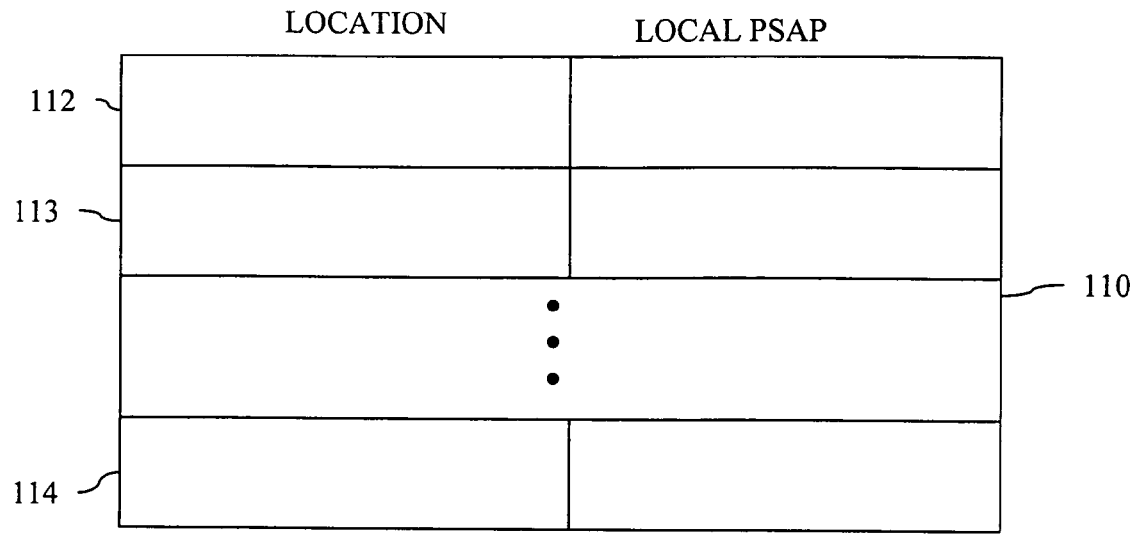
FIG. 8 illustrates a table used to correlate location information with local PSAP information according to the system described herein.

Referring to FIG. 8, a table 110 contains a plurality of elements 112-114 that may be used to correlate user locations with the identity of a particular local PSAP 88. The table 110 may be indexed according to location that may be expressed in terms of a particular city and state. In the cases where large cities have multiple PSAP's, the table 110 may be indexed by city, state, and particular district of the city. Thus, given a particular location for user, the table 110 may be used to determine the appropriate local PSAP to which the emergency call and corresponding information is to be transferred, as discussed in more detail elsewhere herein.

Figure 9:
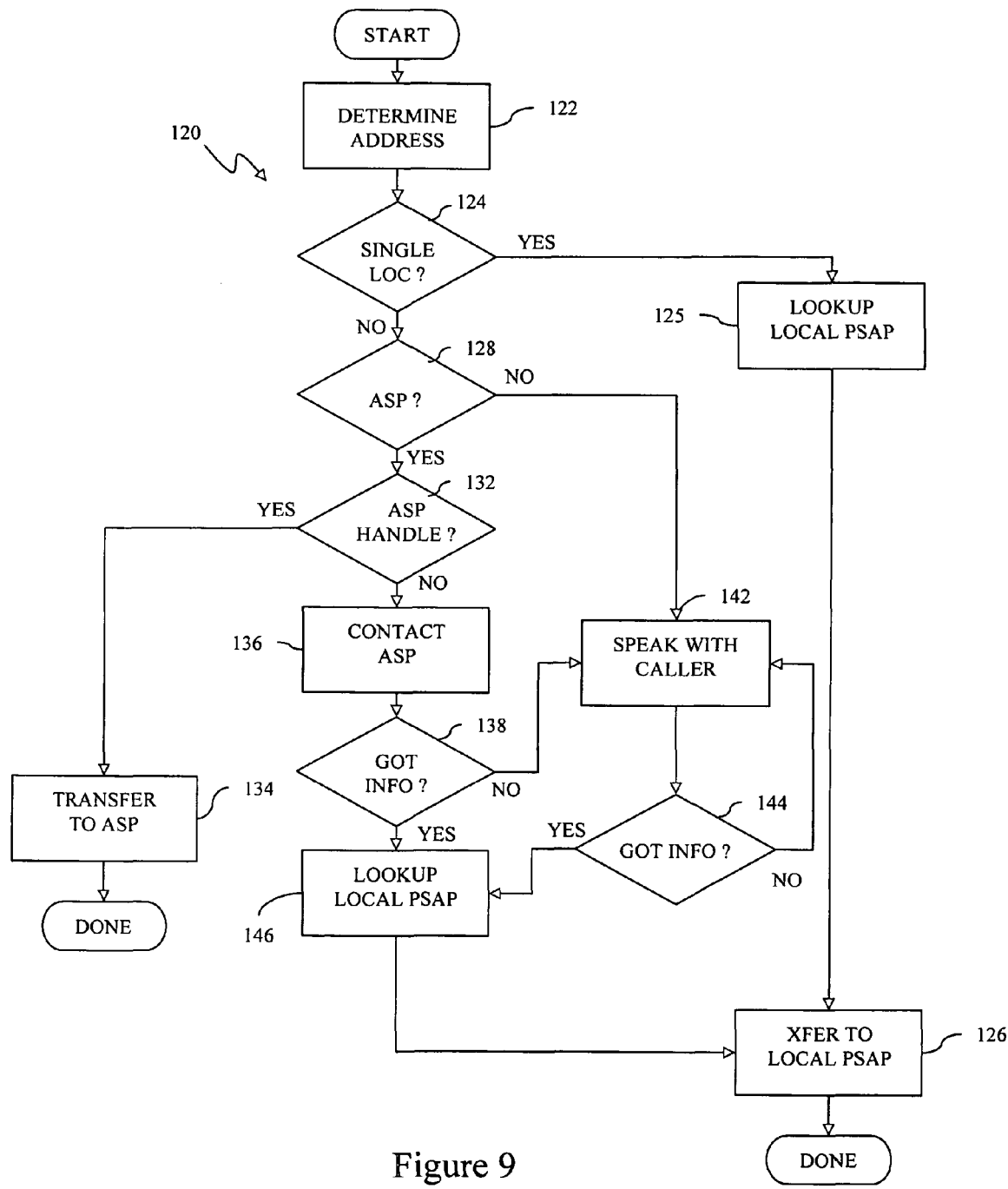
FIG. 9 is a flow chart illustrating processing performed at a VOIP PSAP according to the system described herein.

Referring to FIG. 9, a flowchart 120 illustrates steps performed in connection with processing at the VOIP PSAP 92 to handle an incoming emergency call placed using the network device 22. Processing begins at a first step 122 which determines a usable address from the data provided by the network device 22. Determining the address at the step 122 as discussed in more detail elsewhere herein. Following the step 122 is a test step 124 which determines if the address corresponds to a single location in the table 100. That is, given that the usable address returned from the step 122, is there a corresponding one of the entries 102-104 having a location information that points to a single physical location (for example, a single residence). If so, then control transfers from the test step 124 to a step 125 where the table 110 is consulted to correlate the location information with the identity out the local PSAP 88. Following the step 125 is a step 126 where the emergency call and the corresponding location information are transferred from the VOIP PSAP 92 to the local PSAP 88. Transferring the call at the step 126 may be by any appropriate means including transferring the call through the PSTN 82, possibly transferring the call through the Internet 28, transferring the call via a direct connection between the VOIP PSAP 92 and the local PSAP 88, or by any other appropriate means that may be used to transfer the call and the location information to the local PSAP 88. Note that once the call and information have been transferred to the local PSAP 88, the local PSAP 88 may handle the call in a conventional faction in the same manner that a emergency call from a wired telephone line would be handled. Following the step 126, processing is complete.

If it is determined that the test step 124 that the address returned at the step 122 does not correspond to a single physical location, then control transfers from the test step 124 to a test step 128 where it is determined if an alternative service provider is known. That is, at the test step 128, it is determined if the address or subnet address returned at the step 122 has a corresponding one of the entries 102-104 having alternative service provider information associated there with. If so, then control transfers from the test step 128 to a test step 132 where it is determined if the alternative service provider is to handle the call. In an embodiment herein, in some cases the alternative service provider may handle the emergency call in the same way that the local PSAP 88 handles emergency calls. Thus, for example, the alternative service provider may be an ISP that handles emergency calls on behalf of its users/customers. Thus, if it is determined at the test step 132 that the alternative service provider handles emergency calls, then control transfers from the test step 132 to a step 134 where the call is transferred to the alternative service provider. Transferring the call at the step 134 may be by any appropriate means including transferring the call through the PSTN 82, transferring the call through the Internet 28, and/or transferring the call by any appropriate mechanism. The alternative service provider handling the call at the step 134 is discussed in more detail elsewhere herein. Following the step 134, processing is complete.

If it is determined at the test step 132 that the alternative service provider is not handling emergency calls, then control transfers from the test step 132 to a step 136 where the alternative service providers contacted. In instances where the alternative service provider is not handling emergency calls, it may be possible that the alternative service provider will provide helpful information, such as the locations of users, to assist the VOIP PSAP 92 handling emergency call. This arrangement may be by agreement between the VOIP PSAP 92 and the alternative service provider. Of course, there may be privacy/legal issues that prevent an alternative service provider from providing location information to the VOIP PSAP 92 under some, or possibly all, circumstances.

Following the step 136 is a test step 138 where it is determined if contacting the alternative service provider at the step 136 resulted in receiving the necessary information needed to handle the emergency call (i.e., the physical location of the caller). If not, then control transfers from the test step 138 to a step 142 where an attendant at the VOIP PSAP 92 speaks with the caller. In an embodiment herein, people at the VOIP PSAP 92 may, under some circumstances, speak with a caller in connection with emergency call if the automated system cannot generate the appropriate information to be able to pass the call off to the local PSAP 88. Note that the step 142 is also reach from the test step 128 if there is no information relating to the alternative service provider. Thus, the step 142 is reached if either no alternative service provider can be identified or if, although an alternative service provider is identified, it is not possible to receive appropriate physical location information from the alternative service provider.

Following the step 142 is a test step 144 which determines if speaking with the caller resulted in receiving the information needed to handle the emergency call. If not, then control transfers back to the step 142 to continue speaking with the caller. Note that if there is no automated mechanism for identifying the location of the caller, it is necessary to speak with the caller until the location information is obtained. Also note that, if a caller hangs up before physical location information is obtained, it may not be possible to dispatch emergency services. Once it is determined at the test step 144 that the physical location information for handling the emergency call has been obtained, then control transfers from the test step 144 to a step 146 where the table 110 is consulted to correlate the location information with the identity out the local PSAP 88.

In some instances, the particular local PSAP obtained at the step 146 may simply be the closest PSAP. In some cases, it may be necessary for the PSAP obtained at the step 146 to further transfer the call. However, most, if not all, PSAP installations are equipped to transfer calls when appropriate. Following the step 146, control transfers to the step 126, discussed above. Following the step 126, processing is complete.

Figure 10:
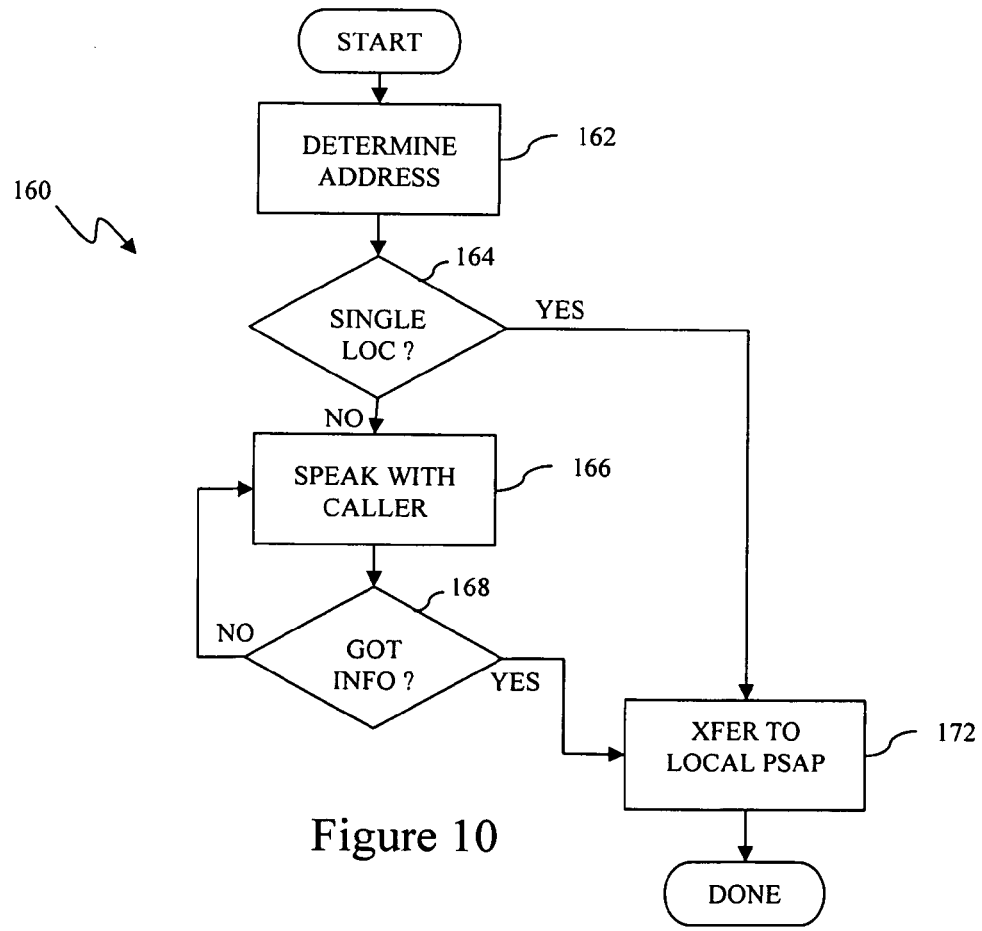
FIG. 10 is a flow chart illustrating processing performed at an alternative service provider according to the system described herein.

Referring to FIG. 10, a flowchart 160 illustrates in more detail processing performed in connection with the step 134 of the flowchart 120 of FIG. 9 where a call is transferred to an alternative service provider. Processing begins at a first step 162 where the data from the network device 22 is examined to determine a useful address that may be used to provide the functionality described herein. Processing at the step 162 is like the processing at the step 122 and is discussed in more detail elsewhere herein. Following the step 162 as a test step 164 which determines if the address determined at the step 162 corresponds to a single physical location of the user. Although it is possible for the alternative service provider to use a table like the table 100 discussed above, it is also possible that the alternative service provider has more information regarding user locations. For example, if the alternative service provider is a cable company providing cable information, then the cable company may be able to identify each of its cable modems and thus be able to identify a physical location for a user coupled to one of the cable modems. Thus, at the step 164, the alternative service provider may consult user information to determine a location of the user.

If it is determined at the test step 164 that it is not possible to determine in an automated fashion a single location for the user, then control transfers from the test step 164 to a step 166 where an attendant at the alternative service provider speaks with the caller to determine location information. Following the step 164 is a test step 168 which determines if speaking with the caller has resulted in obtaining appropriate physical location information. If not, then control transfers from the test step 168 back to the step 166 to continue speaking with the caller. The steps 166, 168 are like the steps 142, 144, discussed above. Once it is determined at the test step 168 that appropriate physical location information has been obtained, then control transfers from the test step 168 to a step 172 where the call and the location information are routed to the local PSAP 88. Note that the step 172 is also reached if it is determined at the test step 164 that it is possible to automatically determine the location of the caller. Routing the call at the step 172 may be by any appropriate means, as discussed elsewhere herein. Following the step 172, processing is complete.

Figure 11:
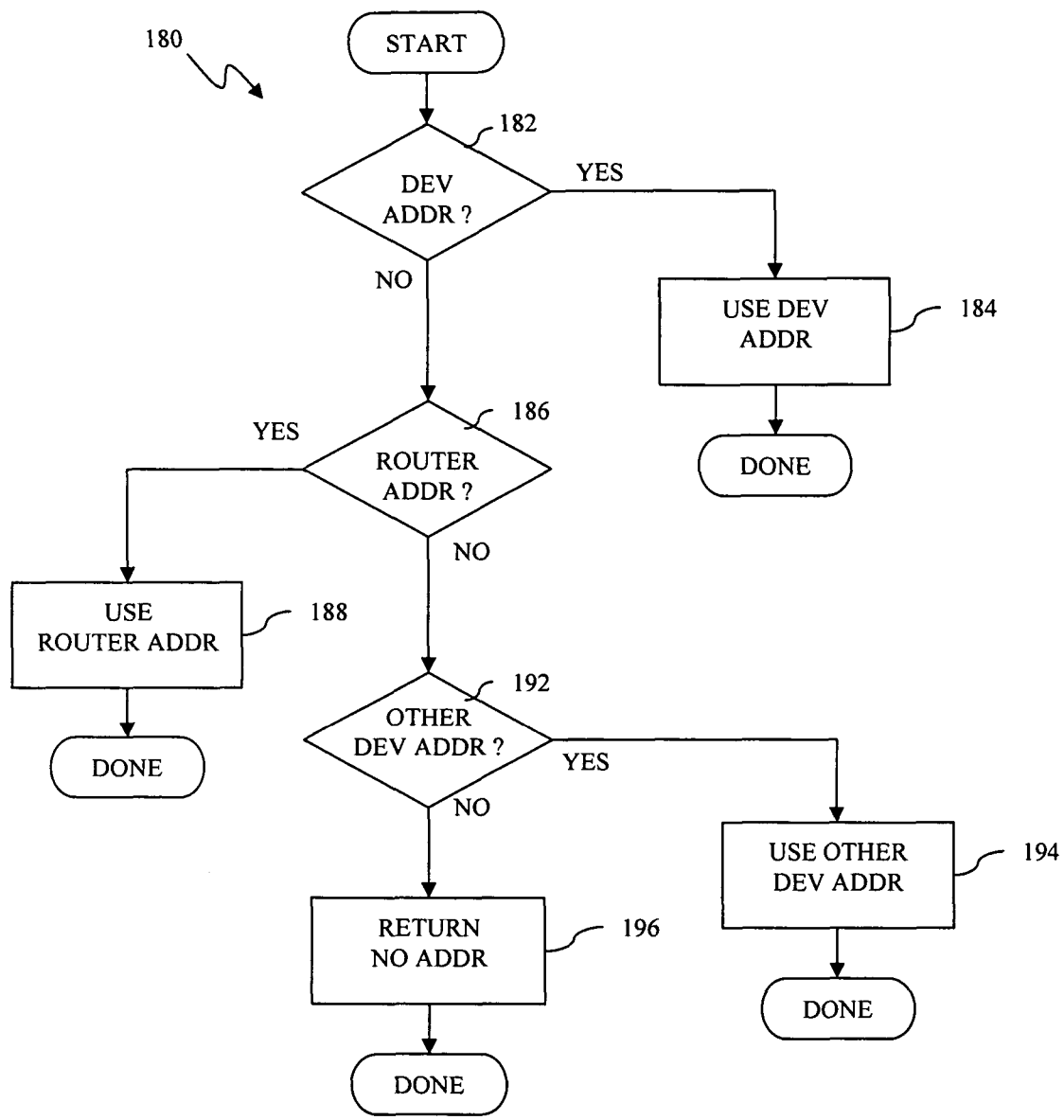
FIG. 11 is a flow chart illustrating determining network address information according to the system described herein.

Referring to FIG. 11, a flowchart 180 illustrates in more detail processing performed in connection with the step 122 of the flowchart 120 of FIG. 9 and/or the step 162 of the flowchart 160 of FIG. 10. Processing begins at a first test step 182 where it is determined in the network device address is appropriate for use in connection with the system described herein. Note that, in some instances, the network device 22 may be given a private address, in which case the network device address would not be appropriate. In other instances, the network device address may not provide enough information and/or have a corresponding entry in the table 100. If it is determined at the test step 182 that the address of the network device 22 is usable for the system described herein, then control transfers from the test step 182 to a step 184 where the device address is used. Following the step 184, processing is complete.

If it is determined at the test step 182 that the device address is not usable, then control transfers from the test step 182 to a test step 186 where it is determine if the address of the router (or equivalent device coupled to the network device 22) is usable. If so, then control transfers from the test step 186 to a step 188 where the router address is used. Following the step 188, processing is complete. If it is determined at the test step 186 that the router address is not usable for the system described herein, then control transfers from the test step 186 to a step 192 where it is determine if the network address of the other device 52 is usable for the system described herein. Note that, for the network address of the other device 52 to be usable, there must be an other device coupled to the Internet 28 that is in the same physical location as the network device 22. If it is determined at the test step 192 that the other device 52 has a network address that is usable for the system described herein, then control transfers from the test step 192 to a step 194 where the network address of the other device is used. Following the step 194, processing is complete.

If it is determined at the test step 192 that the other device 52 does not have a network address that is usable for the system described herein, then control transfers from the test step 192 to a step 196 where the system indicates that there is no network address associated with the device 22 or with the other device 52 (if it exists) that may be used for the system described herein. Note that if the step 196 is reached, it may be likely that it will be necessary to speak with the caller to determine the location thereof. Following the step 196, processing is complete.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of dispatching emergency services based on a communication from a network device, comprising:
   receiving the communication from the network device, the communication initiated by a caller;
   determining a network address associated with the network device;
   determining whether the network address is associated with a single physical location using a test;
   if the network address is associated with a single physical location, identifying location information associated with the network device;
   if the network address is not associated with a single physical location:
      determining whether the network address has an associated alternative service provider, wherein the alternative service provider is an Internet Service Provider that handles emergency calls on behalf of users of the Internet Service Provider; and
      if the network address has an associated alternative service provider, determining whether the alternative service provider can handle the communication,
         if the alternative service provider can handle the communication, transferring the communication to the alternative service provider;
         if the alternative service provider cannot handle the communication, contacting the alternative service provider for location information;
            determining whether contacting the alternative service provider resulted in receiving location information;
            if contacting the alternative service provider did not result in receiving location information, having an attendant speak with the caller to obtain location information; and
   correlating the location information to identify a public service access point and transferring the communication and the location information to the public service access point.

2. The method of claim 1, wherein the network device is a voice over internet protocol telephone.

* * * * *